United States Patent [19]

Bauer et al.

[11] Patent Number: 4,917,731
[45] Date of Patent: Apr. 17, 1990

[54] WATER-SOLUBLE BLACK TRISAZO DYESTUFFS

[76] Inventors: Wolfgang Bauer, 6, Masurenstrasse; Konstantin Morgenroth, 4, Büchertalstrasse, both of 6457 Maintal 3; Kuno Reh, 14, Lauterbacher Strasse, 6000 Frankfurt 61; Josef Ritter, 12, Berliner Strasse, 6238 Hofheim/Ts., all of Fed. Rep. of Germany

[21] Appl. No.: 283,469

[22] Filed: Dec. 12, 1988

[30] Foreign Application Priority Data

Dec. 22, 1987 [DE] Fed. Rep. of Germany ....... 3743527

[51] Int. Cl.$^4$ ............................................. C09D 11/02
[52] U.S. Cl. ..................... 106/22; 534/754; 534/583
[58] Field of Search .................... 106/22; 534/754, 583

[56] References Cited

U.S. PATENT DOCUMENTS

| | | | |
|---|---|---|---|
| 4,033,945 | 7/1977 | Bauer et al. | 534/754 |
| 4,144,230 | 3/1979 | Bauer et al. | 534/754 |
| 4,144,231 | 3/1979 | Bauer et al. | 534/754 |

Primary Examiner—Paul Lieberman
Assistant Examiner—Helene Klemanski
Attorney, Agent, or Firm—Connolly and Hutz

[57] ABSTRACT

Water-soluble black trisazo dyestuffs of the general formula I wherein R denotes hydrogen, alkyl having 1 or 2 carbon atoms, alkoxy having 1 or 2 carbon atoms, acylamino having 2 or 3 carbon atoms or carboxamide and n denotes a number from 0 to 2.5 are suitable for the preparation of recording fluids.

6 Claims, No Drawings

WATER-SOLUBLE BLACK TRISAZO DYESTUFFS

The present invention relates to water-soluble black trisazo dyestuffs of the general formula I

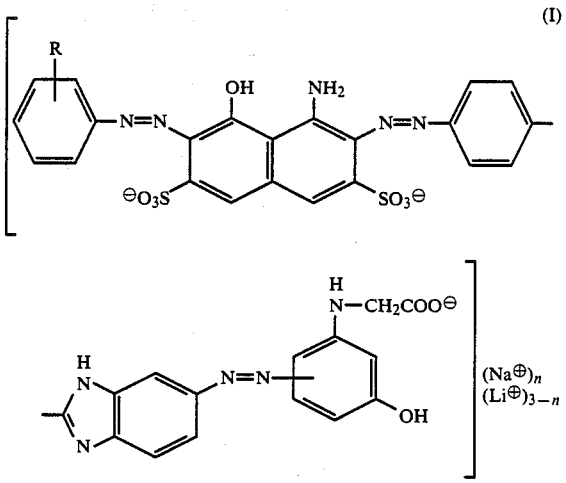

wherein R denotes hydrogen, alkyl having 1 or 2 carbon atoms, alkoxy having 1 or 2 carbon atoms, acylamino having 2 or 3 carbon atoms or carboxamide and n denotes a number from 0 to 2.5.

The invention furthermore relates to processes for the preparation of the dyestuffs of the general formula I and their use for the preparation of recording fluids, in particular for the ink jet printing process, and these recording fluids.

Recording fluids or writing fluids are also called inks. They are used, for example, in ink ball-point pens, felt-tip pens and fountain pens, in printing, marking, writing, drawing and registering devices or in the so-called ink jet printing process.

The ink jet printing process is described, for example, in: Ullmanns Encyklopädie der Technischen Chemie (Ullmann's Encyclopaedia of Industrial Chemistry): 4th edition, Volume 23, (1983), 262–264, and Kirk-Othmer Encyclopedia of Chemical Technology, 3rd edition, Volume 20, (1982), 153–156. It is a contactless printing process in which droplets of a writing fluid are sprayed from a jet or several jets onto the substrate to be printed.

A recording fluid in principle consists of a soluble dyestuff which is dissolved in a solvent, usually water, or in a solvent mixture. The solvent as a rule also contains other auxiliaries, such as, for example, surface-active substances, humectants and/or preservatives.

In order to obtain prints of high quality, that is to say high sharpness and clarity, very high requirements in respect of purity and absence of particles must be imposed on recording fluids for the ink jet printing process. In particular, they should not cause any corrosion or even dry at the jet opening when the jet has stopped, and also should not become encrusted over a prolonged period. These and other requirements mean that the dye-stuffs used for the preparation of recording fluids should contain virtually no salts or standardizing agents and must have a high solubility. The viscosity and in particular the surface tension must furthermore lie within certain ranges, in order to guarantee optimum formation of drops of ink.

Trisazo dyestuffs which are related structurally to those of the general formula I are already known from German Patent Specification 2,424,501.

These dyestuffs were originally prepared for dyeing and printing textile materials and are, in particular, in the form of their sodium salts and usually contain considerable amounts of salts from the preparation, such as, for example, sodium sulphate, sodium acetate and in particular sodium chloride. Such salts are also often even deliberately added to textile dyestuffs as extenders or standardizing agents after the synthesis.

Such salt-containing dyestuffs are not suitable for the preparation of recording fluids for the ink jet printing process, especially because corrosion occurs at the jets, but also because the solubility of the dyestuffs is too low and they have a poor storage stability associated with an increase in viscosity and precipitation of the dyestuff.

There are moreover disadvantages in respect of the surface tension, which means that optimum formation of drops of ink is prevented when the products are used in the ink jet printing process.

The dyestuffs envisaged for the preparation of recording fluids for the ink jet printing process must therefore first be subjected to expensive purification operations requiring much effort, such as are described, for example, in DE-A-35 39 737.

Dyestuffs of the general formula I which can also be prepared in a low-salt form in an economically advantageous manner and are outstandingly suitable for use in the ink jet printing process are provided by the present invention. Compared with the trisazo dyestuff sodium salts mentioned in German Patent Specification 2,424,501, the mixed sodium/lithium salts according to the invention, in particular the trilithium salts, have a higher solubility. The recording fluids prepared from the dyestuffs according to the invention moreover offer advantages in respect of storage stability, viscosity and surface tension.

The dyestuffs of the general formula I according to the invention are mixed sodium and lithium salts or lithium salts of colour acids which contain two sulpho groups and one carboxyl group in the molecule. The total of sodium and lithium ions present in the molecule is accordingly three, it being possible for the number of sodium ions to be 0 to 2.5 and the number of lithium ions 3 to 0.5, depending on the meaning of n.

n preferably denotes a number from 0 to 1. n is especially preferably 0. The radical R can be in the ortho-, meta- or para-position relative to the diazo group and preferably denotes methyl, ethoxy or acetylamino. R especially preferably denotes hydrogen.

According to the invention, the dyestuffs of the general formula I according to the invention can be prepared by a procedure in which a diazotized disazo dyestuff of the general formula II

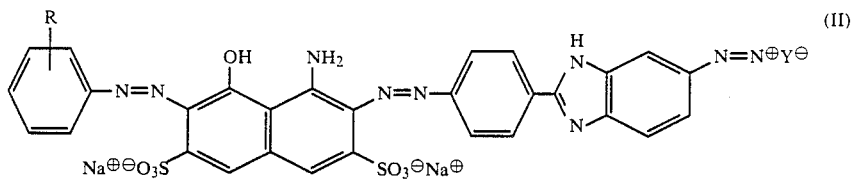

(II)

wherein R has the abovementioned meaning and $Y^\ominus$ stands for the anion of a mineral acid, is converted into the sparingly soluble betaine salt of the general formula III

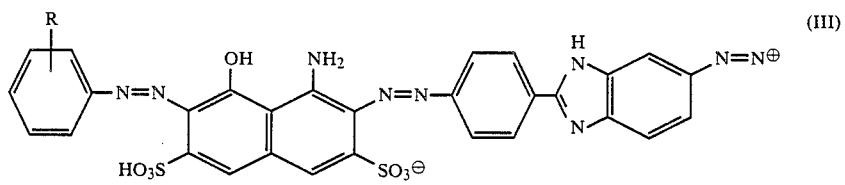

(III)

with a mineral acid at acid pH values of 0 to 3, the mixture is filtered and the product is washed free from electrolytes with water, and the betaine salt of the general formula III is then combined with 3-hydroxyphenylglycine of the formula IV

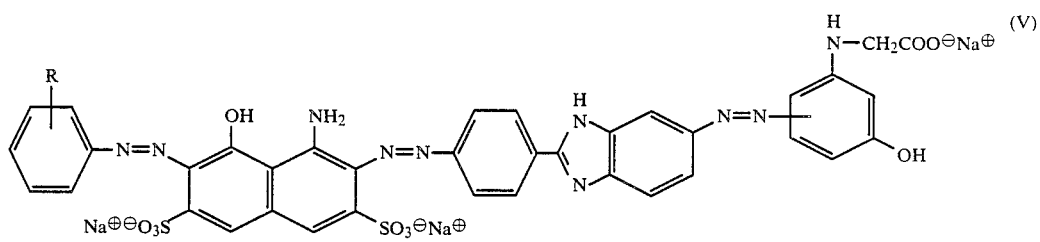

(IV)

in an aqueous medium and coupling is carried out by addition of lithium hydroxide and/or lithium carbonate or mixtures of these lithium bases with sodium hydroxide and/or sodium carbonate and/or sodium bicarbonate at pH values of 6.5 to 9.5.

The coupling is preferably carried out at pH values of 7 to 8.5. The temperatures are usually $-10°$ to $+50°$ C, preferably 0° to 20° C. The aqueous reaction medium can also contain organic solvents, such as, for example, alcohols, such as methanol or ethanol. The coupling can be carried out either in the para-position relative to the hydroxyl groups or in the para-position relative to the glycine substituent of the 3-hydroxyphenylglycine of the formula IV. The compounds of the general formula I are therefore as a rule in the form of a mixture of the corresponding isomers.

In an alternative process, dyestuffs of the general formula I are prepared by a process in which a trisazo dyestuff, which optionally contains electrolytes, of the general formula V

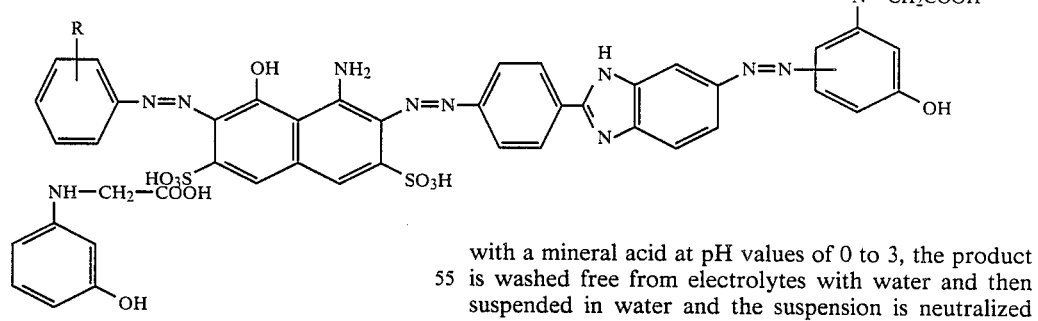

(V)

wherein R has the abovementioned meaning, is converted into the sparingly soluble dyestuff acid of the general formula VI (VI)

with a mineral acid at pH values of 0 to 3, the product is washed free from electrolytes with water and then suspended in water and the suspension is neutralized with lithium hydroxide and/or lithium carbonate or with mixtures of these lithium bases with sodium hydroxide and/or sodium carbonate and/or sodium bicarbonate.

The mineral acids mentioned above are preferably hydrochloric acid and sulphuric acid.

The compositions of the lithium and sodium bases are chosen so that after addition to the solution containing the dyestuff, a ratio of $Na^\oplus:L^\oplus = n:(3-n)$ is present, n denoting a number from 0 to 2.5.

The preparation of the diazotized disazo dyestuffs of the general formula II and of the trisazo dyestuffs of the general formula V is known and decribed, for example, in German Patent Specification 2,424,501.

3-Hydroxyphenylglycine of the formula IV is accessible by condensation of 3-aminophenol with monochloroacetic acid.

The aqueous solutions, obtained if appropriate by clarification by filtration, for example with active charcoal, of the trisazo colour salts of the general formula I according to the invention can be used directly for the preparation of recording fluids. However, it is also possible first to isolate them by drying, for example spray drying, and then to further process them to recording fluids.

The finished recording fluids in general contain 0.5 to 15% by weight of dyestuff (calculated as the dry substance), 0 to 99% by weight of water and 0.5 to 99.5% by weight of solvent and/or humectant. In particular the finished recording fluids contain 0.5 to 15% by weight of dyestuff (calculated as the dry substance), 40 to 85% by weight of water and 15 to 50% by weight of solvent and/or humectant. The finished recording fluids as a rule also contain other additives mentioned below.

The water used for the preparation of the recording fluids is preferably employed in the form of distilled or demineralized water. In addition to water, an organic water-soluble solvent or a mixture of such solvents can also additionally be present in the recording fluids. Suitable solvents are, for example, mono- and polyhydric alcohols and ethers and esters thereof, thus, for example, alkanols, in particular having 1 to 4 C atoms, such as, for example, methanol, ethanol, propanol, isopropanol, butanol, isobutanol and tert.-butanol; di- and trihydric alcohols, in particular those having 2 to 6 C atoms, for example ethylene glycol, propylene glycol, 1,3-propanediol, 1,4-butanediol, 1,5-pentanediol, 1,6-hexanediol, 1,2,6-hexanetriol, glycerol, diethylene glycol and dipropylene glycol; polyalkylene glycols, such as, for example, triethylene glycol, polyethylene glycol, tripropylene glycol and polypropylene glycol; lower alkyl ethers of polyhydric alcohols, such as, for example, ethylene glycol monomethyl, monoethyl, monopropyl or monobutyl ether, diethylene glycol monomethyl or monoethyl ether and triethylene glycol monomethyl or monoethyl ether; ketones and keto alcohols, in particular those having 3 to 7 C atoms, such as, for example, acetone, methyl ethyl ketone, diethyl ketone, methyl isobutyl ketone, methyl pentyl ketone, cyclopentanone, cyclohexanone and diacetone alcohol; ethers, such as, for example, dibutyl ether, tetrahydrofuran and dioxane; esters, such as, for example, ethyl formate, methyl formate, methyl acetate, ethyl acetate, propylene acetate, butyl acetate, phenyl acetate, ethylglycol monoethyl ether acetate and 2-hydroxyethyl acetate; amides, such as, for example, dimethylformamide, dimethylacetamide and N-methylpyrrolidone; and furthermore urea, tetramethylurea and thiodiglycol.

Some of the abovementioned substances not only act as solvents but also display other properties. Thus, for example, the polyhydric alcohols also act as humectants.

Preservatives, such as, for example, phenol derivatives, cationic, anionic or non-ionic surface-active substances (wetting agents) and agents for regulating the viscosity, for example polyvinyl alcohol, cellulose derivatives or water-soluble natural or synthetic resins, as film-forming agents or binders to increase the adhesive strength and abrasion resistance, can also be added to the recording agents.

Amines, such as, for example, ethanolamine, diethanolamine, triethanolamine, N,N-dimethylethanolamine and diisopropylamine, serve chiefly to increase the pH of the recording fluid. They are as a rule present in the recording fluid in an amount of 0 to 10% by weight, preferably 0.5 to 5% by weight.

Data on the compositions of inks, in particular also those for the jet printing process, are to be found, for example, in DE-A-2,132,324, DE-A-2,160,475, U.S. Pat. No. 4,024,096, U.S Pat. No. 4,024,397 and U.S. Pat. No. 4,070,322. The precise composition of the recording fluid is of course adapted to suit the intended use.

In the case of recording fluids for the ink jet printing process, it is also possible, depending on the embodiment of this printing process, for example as the continuous jet, intermittent jet, pulse jet or compound jet process, to add further additives if appropriate, for example for buffering the pH or for adjusting the electrical conductivity, the specific heat, the coefficient of thermal expansion and the conductivity.

The recording fluids can be prepared in a simple manner by mixing the components, which can be effected, for example, by a procedure in which a dyestuff of the formula I is dissolved in water or an aqueous solution obtained in the preparation of the dyestuff of the formula I is further diluted with water if appropriate, and the other components to be added, such as solvents and the like, are then admixed.

The recording fluids containing one or more dyestuffs of the formula I are outstandingly suitable for use in printing, duplicating, marking, writing, drawing, stamping or registering processes, and in particular also for the ink jet printing process. High-quality black prints which have a high sharpness and brilliance and good resistance to water, light and abrasion are thereby obtained. The dyestuffs according to the invention are furthermore advantageous for toxicological reasons.

No deposition of precipitates occurs on storage of inks according to the invention; furthermore, no blocking of the jets occurs when the inks according to the invention are used in ink jet printing. No changes in the physical properties of inks according to the invention moreover occur when they are used in an ink jet printer for a prolonged period under continuous recirculation or intermittently with the ink jet printer being intermediately switched off.

EXAMPLE 1

295 g of the low-salt diazotized disazo dyestuff obtained according to 1(a) are stirred with 250 ml of water. The resulting suspension is slowly added to the 3-hydroxyphenylglycine solution prepared according to 1(b), to which 5.3 g of sodium carbonate, 3.7 g of lithium carbonate and 50 g of ice have been added. The mixture is subsequently stirred at pH 7.5 to 8 for 1 hour and the dyestuff solution is concentrated to dryness in vacuo at 70° to 80° C. 73.5 g of a black dyestuff of the formula

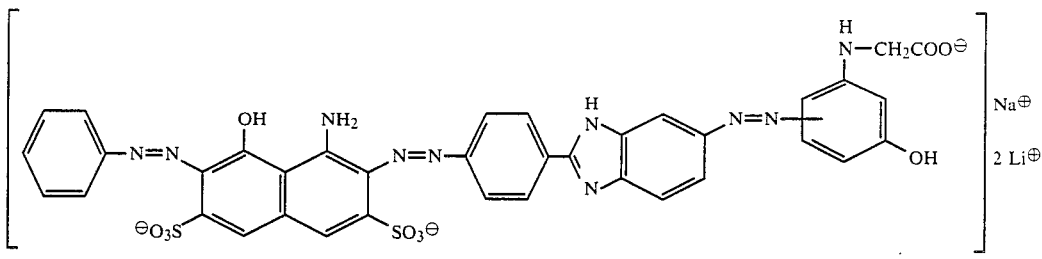

which is outstandingly suitable for the preparation of recording fluids for the ink jet printing process are obtained.

1(a) Preparation of the Diazotized Disazo Dyestuff 30 g of 1-amino-8-hydroxy-naphthalene-3,6-disulphonic acid are dissolved in 100 ml of water by addition of sodium carbonate so that the solution has a pH of 6.5.

22.4 g of 2-(4'-aminophenyl)-5-(or 6)-aminobenzimidazole are tetrazotized in a mixture of 200 ml of water and 50 ml of 30% strength aqueous hydrochloric acid with a solution of 13.8 g of sodium nitrite in 50 ml of water at 0° to 5° C., with the addition of ice.

After addition of the sodium nitrite solution, the mixture is subsequently stirred at 0° to 5° C. for about 1 hour and excess nitrous acid is then removed with sulphamic acid. The solution of the 1-amino-8-hydroxy-naphthalene-3,6-disulphonic acid is then added dropwise to the solution of the tetrazo component, which is buffered to pH 2 with sodium acetate solution, and the one-sided coupling is brought to completion by stirring at 10° to 15° C. and adding sodium acetate solution up to a pH of 2.5. A diazobenzene solution, prepared in a known manner from 8.45 g of aniline, 25 ml of 30% strength aqueous hydrochloric acid and a solution of 6.3 g of sodium nitrite in 20 ml of water at 0° C., is then added to the suspension of the diazotized monoazo dyestuff, which has been cooled to 0° to 5° C. with ice, and the pH is brought to 8.5 to 9 with 10% strength sodium carbonate soltuion. The suspension of the green diazotized disazo dyestuff of the formula II (R=hydrogen, $Y^\ominus=Cl^\ominus$) is brought to pH 1.5 with 70 ml of 30% strength hydrochloric acid, filtered and washed free from chloride with 2 l of water.

Yield: 295 g of press cake.

1(b) Preparation of 3-Hydroxyphenylglycine 9.2 g of monochloroacetic acid are introduced into 40 ml of water and converted into the lithium salt with 4.1 g of lithium hydroxide monohydrate. 10.4 g of 3-aminophenol are then added and the mixture is stirred at 90° C. for 2 hours. It is then cooled to 20° C. and brought to pH 7 with sodium carbonate.

EXAMPLE 2

A solution of 3-hydroxyphenylglycine prepared analogously to Example 1(b) but using 4 g of sodium hydroxide instead of 4.1 g of lithium hydroxide monohydrate is added to the alkaline suspension, prepared according to Example 1a, of the green diazotized dyestuff.

The mixture is stirred at pH 8 to 8.5 for 3 hours, 83 ml of 30% strength hydrochloric acid are added up to a pH of 1.5 and the mixture is filtered. The filter cake is washed free from electrolytes with about 2 liters of water and the resulting colour acid is introduced as the moist press cake (530 g) into 1.7 l of water. The mixture is not neutralized with about 12.6 g of lithium hydroxide monohydrate and the solid is dissolved at 80° C. 8 g of active charcoal and 0.5 g of a filtration auxiliary are then added, the mixture is filtered and the black dyestuff solution is concentrated to dryness.

70 g of a black dyestuff of the formula

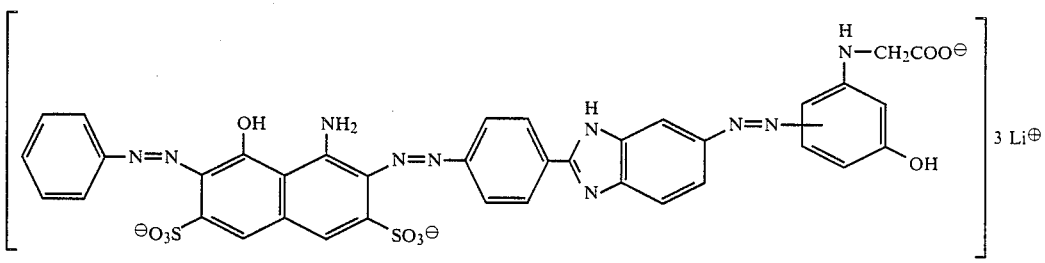

which is particularly suitable for the preparation of recording fluids for the ink jet printing process are obtained.

The following Table 1 shows further examples of black trisazo dyestuffs of the general formula I according to the invention which can be prepared in accordance with the instructions in Example 1 or 2.

TABLE 1

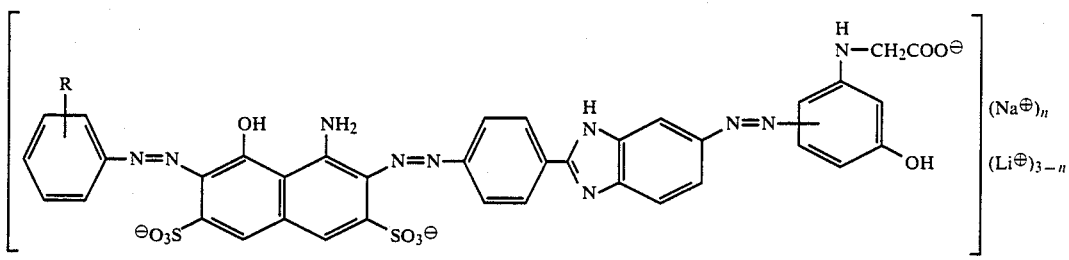

| Example | R | n |
|---------|---|---|
| 3 | H | 2 |
| 4 | H | 1.5 |
| 5 | methyl | 0.5 |
| 6 | ethoxy | 0 |
| 7 | acetylamino | 0 |

EXAMPLE 8

To test the technological properties of the recording fluids according to the invention in comparison with recording fluids containing known black dyestuffs, various inks are prepared in accordance with the following recipe: 4% by weight of dyestuff, 4% by weight of triethanolamine, 77% by weight of water (distilled) and 15% by weight of diethylene glycol. The pH of the inks is 8.5 to 9.5, depending on the dyestuff.

Testing is carried out as follows:

1. Determination of the Heat Stability

A 4% strength ink is divided into two samples. One sample is stored in a closed vessel at 90° C. for 4 days and the other remains untreated. The deviation in colour shade of the two solutions is now measured in an L*a*b* colour chamber in accordance with DIN 6174. The deviation in colour shade is stated in Δ E units.

2. Determination of the Lightfastness

The lightfastnesses were measured in the 4% strength dyestuff solution in accordance with DIN 54004. In the comparison scale used here (blue wool scale), the rating 1 denotes a very low lightfastness and the rating 8 a very high lightfastness.

3. Determination of the Viscosity

The viscosities are determined on a Viscowaage from Haake in accordance with DIN 53015.

4. Determination of the Storage Stability

The inks are stored in a closed vessel at 90° C. for 4 days and then at room temperature for a further 3 months. Precipitations (sediment) and crystallization at the edge of the liquid are evaluated in accordance with the following classification:
1 = no crystallization
2 = crystallization

5. Determination of the Surface Tension

The surface tension of the inks was determined with a digital tensiometer from Kryos by ring method of Du Noüy and Wilhelmy.

The results obtained in the abovementioned tests are summarized in the following table:

| Dyestuff | Heat stability ΔE | Light-fastness | Viscosity in mPa.s | Storage stability | Surface tension in dyne/cm |
|---|---|---|---|---|---|
| according to the invention from Example 2 | 0.22 | 3–4 | 2.5 | 1 | 54 |
| Prior art: Food Black 1 | 58 (decomposition) | 3 | 2.6 | 2 | 51 |
| Food Black 2 | 0.8 | 3 | 2.9 | 2 | 45 |
| Trisodium salt of the dyestuff according to Example 2 | 0.35 | 3–4 | 3.2 | 2 | 48 |

The results show that the dyestuffs according to the invention are significantly superior to the prior art.

We claim:

1. Water soluble black trisazo dyestuffs of the general formula I

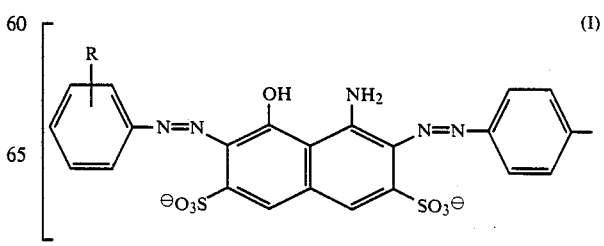

(I)

5. Process for the preparation of trisazo dyestuffs of the general formula I mentioned in claim 1, characterized in that a diazotized disazo dyestuff of the general formula II

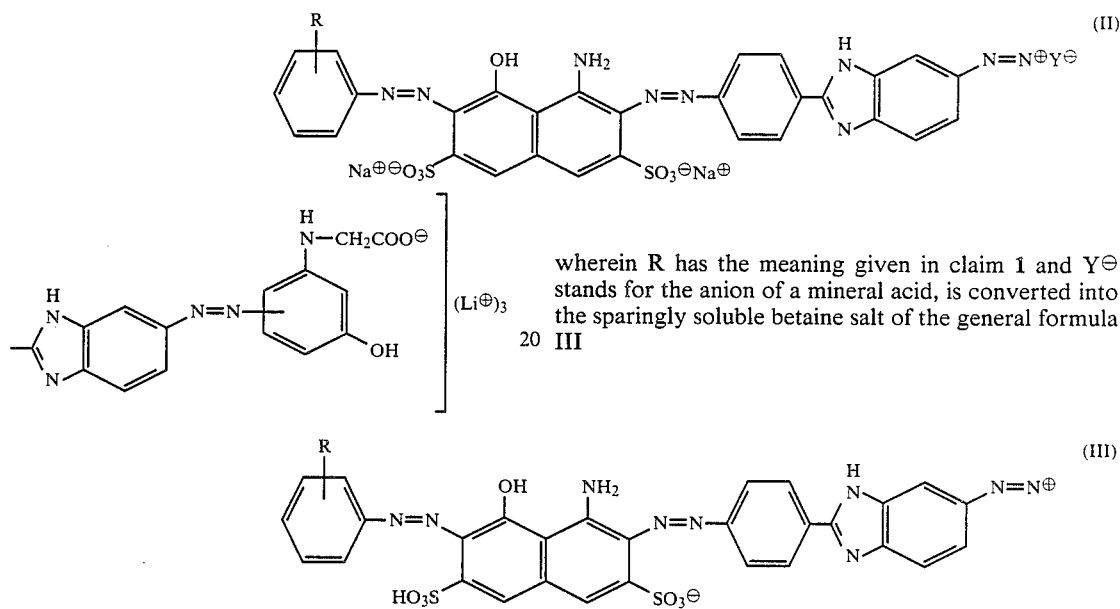

wherein R has the meaning given in claim 1 and $Y^\ominus$ stands for the anion of a mineral acid, is converted into the sparingly soluble betaine salt of the general formula III wherein R denotes hydrogen, alkyl having 1 or 2 carbon atoms, alkoxy having 1 or 2 carbon atoms, acylamino having 2 or 3 carbon atoms or carboxamide.

2. Trisazo dyestuff according to claim 1, characterized in that R denotes hydrogen.

3. Recording fluid containing 0.5 to 15% by weight of dyestuff of the general formula VII with a mineral acid at acid pH values of 0 to 3, the mixture is filtered and the product is washed free from electrolytes with water, and the betaine salt of the general formula III is then combined with 3-hydroxyphenylglycine of the formula IV

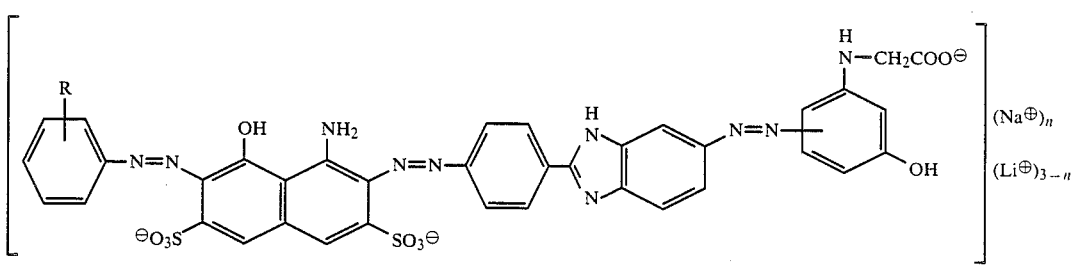

wherein R denotes hydrogen, alkyl having 1 or 2 carbon atoms, alkoxy having 1 or 2 carbon atoms, acylamino having 2 or 3 carbon atoms or carboxamide and n denotes a number from 0 to 2.5 and
  0 to 99% by weight of water and 0.5 to 99.5% by weight of a mixture of solvent and humectant.

4. Recording fluid according to claim 3, containing 0.5 to 15% by weight of dyestuff, 40 to 85% by weight of water and 15 to 50% by weight of a mixture of solvent and humectant.

in an aqueous medium and coupling is carried out by addition of lithium hydroxide, lithium carbonate or mixtures thereof at pH values of 6.5 to 9.5.

6. Process for the preparation of trisazo dyestuffs of the general formula I mentioned in claim 1, characterized in that a trisazo dyestuff, optionally containing electrolytes, of the general formula V

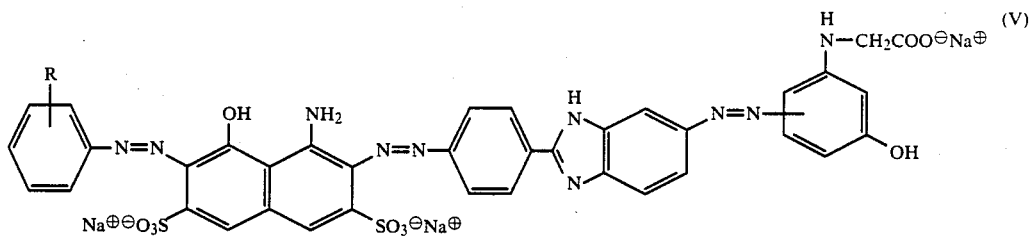
wherein R has the meaning given in claim 1, is converted into the sparingly soluble dyestuff acid of the general formula VI
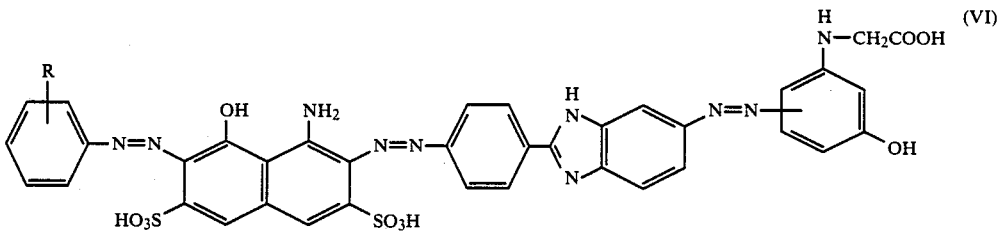
with a mineral acid at acid pH values of 0 to 3, the product is is washed free from electrolytes with water, and then suspended in water and the suspension is neutralized with lithium hydroxide, lithium carbonate or mixtures thereof.
* * * * *